United States Patent [19]
Hoff et al.

[11] Patent Number: 6,100,370
[45] Date of Patent: Aug. 8, 2000

[54] SOFTENER-FREE POLYAMIDE AND MOLDING COMPOSITION AND USE THEREOF

[75] Inventors: Heinz Hoff, Tamins; Ulrich Wolf, Domat/Ems, both of Switzerland

[73] Assignee: Ems-Chemie AG, Switzerland

[21] Appl. No.: 09/305,959

[22] Filed: May 6, 1999

[30] Foreign Application Priority Data

May 8, 1998 [DE] Germany .............. 198 20 661

[51] Int. Cl.[7] .................. C08G 69/40; C08G 73/00; C08G 69/44
[52] U.S. Cl. .................. 528/310; 528/125; 528/128; 528/170; 528/272; 528/274; 528/288; 528/292; 528/322; 528/332; 528/335; 528/336
[58] Field of Search .................. 528/125, 128, 528/170, 322, 310, 332, 335, 336, 272, 292, 288, 274

[56] References Cited

U.S. PATENT DOCUMENTS 5,574,128  11/1996  Judas et al. .............. 528/288

FOREIGN PATENT DOCUMENTS

| 0 069 475 | 11/1986 | European Pat. Off. . |
| 0 233 428 | 9/1989 | European Pat. Off. . |
| 35 45 033 | 7/1986 | Germany . |
| 1043507 | 9/1966 | United Kingdom . |
| WO 85/02852 | 12/1984 | WIPO . |
| WO 91/13918 | 9/1991 | WIPO . |

*Primary Examiner*—P. Hampton-Hightower
*Attorney, Agent, or Firm*—Marshall & Mellhorn

[57] ABSTRACT

The invention concerns a softener-free polyamide prepared by polycondensation and/or polymerization of polyamide-forming monomers, wherein it was obtained by adding 5–50 wt. % of a dimer diol with a molecular weight within the range of 400–1000 and/or corresponding OH-terminated polyesters.

12 Claims, 3 Drawing Sheets

SOFTENER-FREE POLYAMIDE AND MOLDING COMPOSITION AND USE THEREOF

BACKGROUND OF THE INVENTION

1. Field of the Invention

The invention concerns polyamides which are modified with dimer diol and dimer diol-containing hydroxyl-terminated polyesters. In comparison with the unmodified polyamides, the modified polyamides according to the invention have increased flexibility and viscosity even at low temperatures. No change in mechanical properties owing to loss or migration of softener on contact with media or under the influence of heat occurs due to the inherent softening. The flexible polyamides compared with other diol-containing polyamides show excellent resistance to hydrolysis. The invention further concerns a corresponding molding composition and use thereof.

2. Description of the Prior Art

For making polyamides flexible, numerous starting points are described in the literature such as the inclusion of additional polyamide-forming monomers in polyamide homopolymers, which improve the flexibility and low-temperature behavior.

Another possibility is afforded by incorporating polyamide-compatible softeners into polyamide molding compositions. Here sulphonamides and hydroxybenzoates which, like the polyamides themselves, are capable of forming hydrogen bridge bonds and reduce the glass transition temperature of the polyamides, are used in particular. Flexible polyamides are also obtained by compounding with at least one further highly flexible blending component, partly in combination with low molecular softeners. In EP 0 233 428 polyamide is processed with a polyetheramide block polymer and a thermoplastic elastomer from the group MBS, ABS, EPDM, NBR into a flexible formulation. DE 3 545 033 describes making polyamide flexible by the use of a combination of thermoplastic polyurethane elastomers and maleic acid-grafted polyolefins to make polyamide flexible.

N-alkylation of polyamides also has a flexible effect. The resulting decrease in hydrogen bridge bonds affects the properties of polyamide greatly. The polymer melting point drops, the solubility is increased and extended to a plurality of solvents and the polymer assumes rubber-like properties, depending on the degree of substitution.

By incorporating flexible polyester, polyether or polyolefin segments into polyamide block polymers, the result is likewise flexible polymers. In US document U.S. Pat. No. 5,574,128, both polyether diols and polyether diamines are described as soft segments in combination with polyamide blocks.

Similarly to the polyether esteramides, WO-8 502 852 describes flexible polyester amides with polycaprolactone segments in the main chain. Statistical polyester amides with a low-molecular diol component are described in EP 0 069 475.

According to this there are numerous possible ways of making homopolyamides or copolyamides flexible and giving them good impact strength even at low temperatures. Suitable low-molecular softeners can render substances flexible very effectively but without simultaneously ensuring very low impact strength at low temperatures, so that frequently compounding with impact strength modifiers is necessary. Furthermore softened polyamides have the disadvantage that the softener migrates into adjoining media or to the surface of work pieces and so the polymeric material becomes more and more brittle. Migration of the softener into adjoining media or to the surface of work pieces migrates and so the polymeric material becomes more and more brittle.

Polymer mixtures as a rule require a higher concentration of a component to render them flexible, so that similar moduli as with softened polyamides are obtained. But by this means frequently the properties typical of polyamides are lost.

SUMMARY OF THE INVENTION

It was therefore the object of the underlying invention to find a non-migrating substance to make polyamides flexible, which has high efficiency and simultaneously gives the basic polyamide a favorable low-temperature behavior as well as good resistance to hydrolysis.

Surprisingly it was found that dimer diol and dimer diol-containing polyester diols even at relatively low concentrations cause polyamides to become significantly more flexible and the modified polyamides show good impact strength even at low temperatures. The efficiency is almost comparable to that of lower-molecular softeners, and the attainable impact strength is even distinctly better than with softened polyamides.

The invention therefore concerns flexible, softener-free polyamides, formed from ordinary polyamide-forming monomers as well as 5–50 wt. % dimer diol and/or dimer diol-containing polyester diols.

Basically all ordinary lactams, aminocarboxylic acids, dicarboxylic acids and diamines can be used as the polyamide-forming monomers. The polyamide component is however preferably based on PA 6, PA 6 6, PA 6 9, PA 6 10, PA 6 12, PA 6 36, PA 11, PA 12, PA I2 12, as well as copolyamides and multipolyamides based on the $C_2$–$C_{36}$ dicarboxylic acids and $C_2$–$C_{12}$ diamines as well as lactam-6, lactam-12 isophthalic acid, terephthalic acid and naphthalene dicarboxylic acid. The PA component can also be obtained by polycondensation of the corresponding salts of diamine and dicarboxylic acid.

The aliphatic dimer diols used have a molecular weight between 400–1000 and are obtainable by reduction of both carboxyl groups of the hydrated fatty acids into primary alcohol groups. Dimer diol can be prepared for example by hydration of dimeric fatty acids and/or esters thereof according to GB 1043507. Another possible way of preparing dimer diols consists of dimerization of unsaturated alcohols in the presence of silica/alumina catalysts and basic alkali metal compounds according to international application WO-91/13918. The basic hydrated dimeric fatty acids are obtainable by dimerization of octadiene acids, if necessary adding octene acids, followed by hydration, or by dimerization of erucaic acid followed by hydration. The dimer diols which have been prepared by the industrial methods mentioned above always have varying quantities of trimer triols and monofunctional alcohols. The preferred diol component is a dimer diol ($C_{36}$ and/or $C_{44}$) which has a dimer diol content of at least 90%, a monodiol content of $\leq 1\%$ and a triol content of $\leq 5\%$ and whose hydroxyl number is within the range between 195–205 mg KOH/g. Preferably dimer diols which have a dimer diol content of more than 97% and a trimer triol content and content of monofunctional alcohols of less than 0.5% each are used.

The OH-terminated polyester diols are prepared by condensation of the dimer diols already described above with aliphatic and/or aromatic $C_4$–$C_{44}$ dicarboxylic acids, the hydrated $C_{36}$ dimeric fatty acid being used preferably. The polyester diols used according to the invention have a hydroxyl number within the range between 28 and 90 mg KOH/g, preferably between 60–80 mg KOH/g. The "flexible polyamides" according to the invention can be prepared both in one stage and in two stages. In the former case the polyamide-forming monomers with the diol components are together put in a reactor and condensed first at normal pressure and later at reduced pressure into the high-molecular polyester amides. In the case of two-stage synthesis, first a polyamide segment is formed from the polyamide-forming monomers under ordinary conditions and then combined with the diol components under esterification conditions. The known esterification and condensation catalysts based on the elements Ge, Sn, Sb, Ti, Zr are possible as the catalyst. The concentration of diol component is here preferably within the range of 10–30 wt. %, particularly preferably within the range of 10–20 wt. % of the total formulation.

The invention also concerns molding compositions for the manufacture of fibers, sheets and moldings which are made of the polyamide according to the invention. It is also possible to include in the "polyamide molding composition" according to the invention the usual reinforcing materials or fillers such as mineral fillers, UV stabilizers, antioxidants, pigments, dyes, nucleating agents, crystallization accelerators or retarders, flow promoters, lubricants, mold release agents, flame proofing agents and agents which improve the electrical conductivity, as well as modified or unmodified rubbers. By chain-linking agents which can react with amine, hydroxy or carboxyl terminal groups such as for example carbodiimides, bisoxazolines and diisocyanates, in addition a significant chain structure can be produced and hence a high melt viscosity can be set.

The invention further concerns the use of flexible, softener-free polyamides for the manufacture of fibers, sheets and molded bodies such as e.g. monopipes and also as hot-melt adhesives for textile and technical applications. With the molding composition according to the invention, thermoplastic multilayer composites can also be produced, consisting of at least one layer of a molding composition based on the flexible, softener-free polyamides and further layers based on polyester or polyamide or a further polymer class.

The moldings and multilayer composites are used in structural members mainly in the field of the automobile, electrical and mechanical engineering industries. The invention therefore also concerns monolayer or multilayer polymer hoses or pipes which if necessary can also be corrugated in a partial region.

BRIEF DESCRIPTION OF THE DRAWINGS

The invention is explained in more detail in the following drawings and description.

DESCRIPTION OF THE PREFERRED EMBODIMENT

Figure 1:
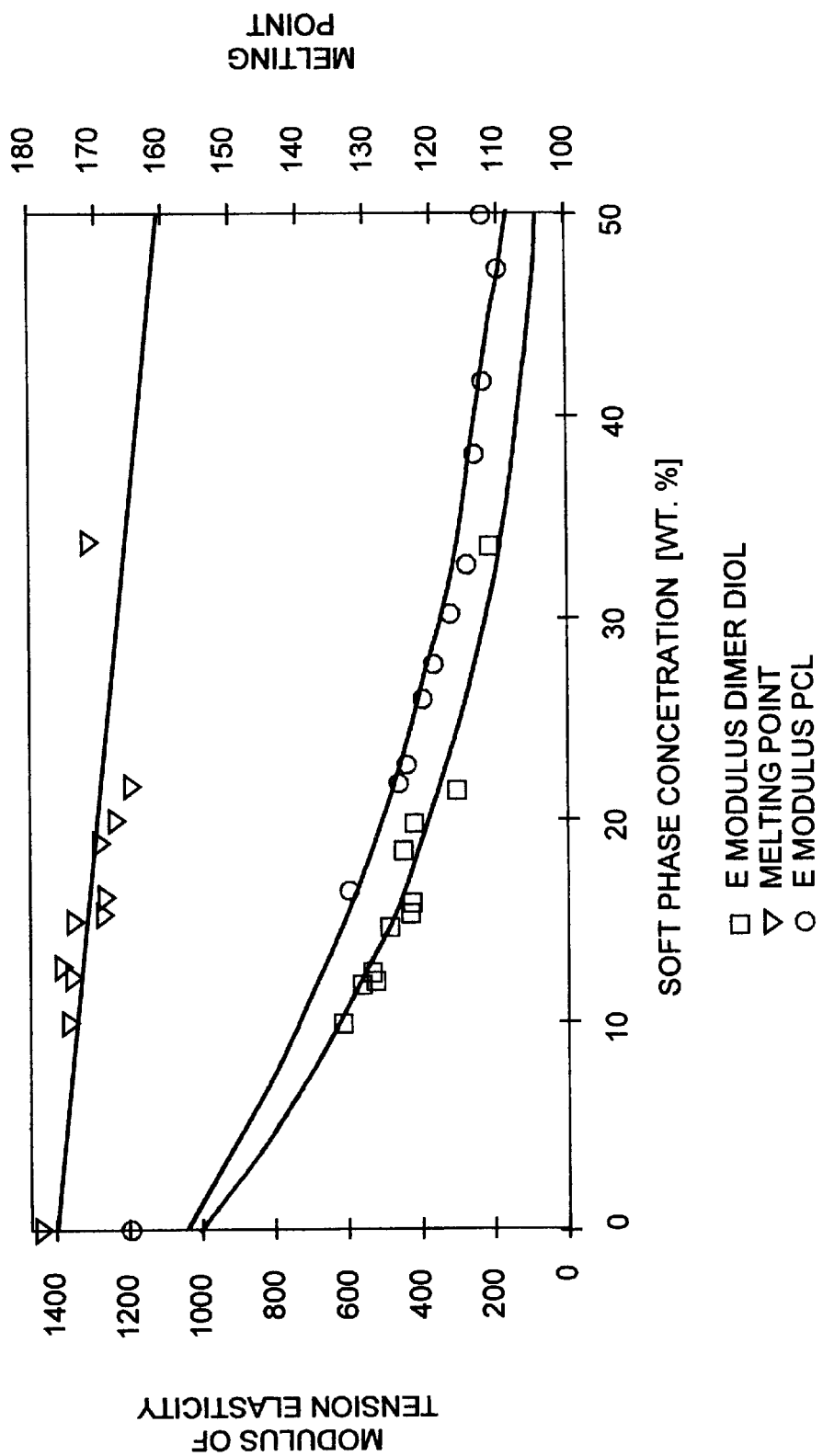
FIG. 1 is a graph showing composition flexability comparisons.

The invention is described in more detail below by several examples.

EXAMPLES 1–15

The lactams or aminocarboxylic acids, dicarboxylic acids and diamines are condensed at normal pressure in a nitrogen atmosphere at temperatures up to 290 or 250° C. in a test reactor until the ring opening is closed or water separation declines. Then dimer diol (for example Pripol 2033 from Unichema Int.) and/or dimer diol dimerate (for example Priplast 3197 from Unichema Int.), which has an average molar mass of approximately 2000 g/mol, is introduced together with the esterification catalyst via a valve into the agitated polyamide melt. Immediately after addition is completed a vacuum is applied so that a final pressure of $\leq 10$ mbar is obtained within 90 minutes. At an oil temperature of 250° C. the reaction mixture is condensed out to a predetermined torque and the product is discharged by means of a spinning pump and granulated.

Before further processing, the granulate is dried to a water content below 0.05%. With an Arburg Allrounder 320-210-750, DIN tension rods and small DIN bars were injection-molded. The blown films were manufactured on a Collin laboratory apparatus and the 8×1 monopipes on a Nokia-Maillefer 3-layer pipe extrusion apparatus.

The material composition is shown in Table 1a and 1b.

TABLE 1a

Educts and initial weights for examples 1–12; data in kg;
ADA = aminolauric acid, LL = lauryl lactam,
CL = caprolactam, DDA = dodecane dicarboxylic acid,
TPA = terephthalic acid

| Example | ADA | LL | CL | DDA | TPA | dimer diol | dimer diol dimerate |
|---|---|---|---|---|---|---|---|
| 1 | 38.00 | — | — | 1.682 | — | 4.060 | — |
| 2 | 36.00 | — | — | 2.016 | — | 4.870 | — |
| 3 | 34.00 | — | — | 2.591 | — | 6.250 | — |
| 4 | 30.0 | — | — | 3.578 | — | 8.630 | — |
| 5 | 3.150 | 28.85 | — | 1.533 | — | 2.090 | 6.330 |
| 6 | 3.150 | 28.85 | — | 1.992 | — | 4.240 | 4.240 |
| 7 | 3.150 | 28.85 | — | 2.738 | — | 6.460 | 2.150 |
| 8 | 35.00 | — | — | 2.944 | — | 6.750 | 2.000 |
| 9 | 35.00 | — | — | 1.549 | — | 3.540 | 1.070 |
| 10 | 35.00 | — | — | 2.192 | — | 5.000 | 1.500 |
| 11 | 30.0 | — | — | 1.690 | — | — | 15.00 |
| 12 | — | — | 38.97 | — | 3.531 | 12.50 | — |

TABLE 1b

Educts and initial weights for examples 13–15; data in kg;
ADA = aminolauric acid, SEA = sebacic acid,
HMDA = diaminohexane, DDA = dodecane dicarboxylic
acid, TPA = terephthalic acid

| Example | AH salt | TPA | SEA | DDA | ADA | HMDA | dimer diol |
|---|---|---|---|---|---|---|---|
| 13 | 35.00 | — | 2.408 | — | — | — | 6.790 |
| 14 | 15.81 | — | 14.63 | — | — | 7.007 | 6.860 |
| 15 | — | 7.413 | — | 2.891 | 22.41 | 5.187 | 7.140 |

The properties of the products are compiled in Table 2. The flexible polyamides have in general very good mechanical properties. The crystallization behavior is only slightly altered from the basic homopolymer, so that further processing of the products can also be carried out without problems. Thus blown films or monopipes with good properties can be manufactured. The 8×1 monopipes made of flexible polyamide of examples 2–12 withstand the DIN impact test at 40 and −50° C. without breaking, without an additional impact strength modifier being used.

The blown films were extruded without any further compounding or rolling of the raw granules. However the flexible polymers could easily be processed into blown films at the first blow. The films have a high tear resistance and breaking elongation and are transparent up to thicknesses of 80 $\mu$m.

The melting points are below the basic homopolyamides or copolyamides, this being as a rule the more so, the higher the proportion of diol components which have been made flexible.

TABLE 2

Properties of the products described in examples 1–12;
$T_m$: melting point, $T_g$: glass temperature, TR: tear resistance, BE: breaking elongation,
MD: longitudinally, CD: tranversely, IS: impact strength

| Example | $C_{rel}$ | $T_m$ °C. | $T_g$ °C. | E modulus MPa | TR MPa | BE % | TR MD MPa | TR CD % | BE MD MPa | BE CD % | IS tension bar | IS pipe | diol fraction wt. % |
|---|---|---|---|---|---|---|---|---|---|---|---|---|---|
| 1 | 1.97 | 173 | 18 | 630 | 33 | 180 | — | — | — | — | no break | — | 9.9 |
| 2 | 1.90 | 173 | 15 | 540 | 36 | 250 | — | — | — | — | no break | no break | 12.2 |
| 3 | 1.85 | 169 | 10 | 450 | 36 | 260 | — | — | — | — | no break | no break | 15.5 |
| 4 | 1.81 | 165 | 7 | 320 | 33 | 260 | — | — | — | — | no break | no break | 21.8 |
| 5 | 1.88 | 174 | 20 | 480 | 35 | 280 | — | — | — | — | no break | no break | 20.2 |
| 6 | 1.73 | 172 | 16 | 470 | 38 | 300 | — | — | — | — | no break | no break | 20.0 |
| 7 | 1.74 | 170 | 10 | 460 | 28 | 160 | — | — | — | — | no break | no break | 20.0 |
| 8 | 1.82 | 167 | 11 | 450 | 37 | 310 | 66 | 49 | 580 | 500 | no break | no break | 20.0 |
| 9 | 1.88 | 173 | 18 | 570 | 43 | 300 | — | — | — | — | no break | no break | 12.0 |
| 10 | 1.87 | 169 | 12 | 430 | 38 | 280 | — | — | — | — | no break | no break | 16.0 |
| 11 | 1.76 | 171 | 20 | 230 | 20 | 180 | — | — | — | — | no break | no break | 34.0 |
| 12 | 1.63 | 203 | 30 | 400 | 42 | 330 | 66 | 360 | 81 | 450 | no break | no break | 23.0 |
| 13 | 1.70 | 240 | 45 | 1000 | 50 | 100 | — | — | — | — | no break | — | 17.1 |
| 14 | 1.85 | 196 | 30 | 600 | 48 | 220 | — | — | — | — | no break | — | 17.1 |
| 15 | 1.90 | 220 | 45 | 800 | 55 | 120 | — | — | — | — | no break | — | 17.1 |

COMPARATIVE EXAMPLES 1–11

Lauryl lactam and dodecane dicarboxylic acid are reacted at normal pressure in a nitrogen atmosphere at temperatures of up to 290° C. in a test reactor until there is equilibrium. Then the melted polycaprolactone diol with a mean molar mass of 1000, 2000 or 3000 g/mol together with an esterification catalyst is introduced via a valve into the agitated polyamide melt. Immediately after addition is completed a vacuum is applied, so that a final pressure of ≦10 mbar is obtained within 90 minutes. At an oil temperature of 240–250° C. the reaction mixture is condensed out to a predetermined torque and the product is discharged by means of a spinning pump and granulated. The material composition and the properties are shown in Table 3.

TABLE 3

Formula and properties of comparative examples 1–11;
LL: lauryl lactam, DDA: dodecane dicarboxylic
acid, PCL: polycaprolactone

| Comparative Example | LL kg | DDA kg | PCL diol kg | E modulus MPa | TR MPa | BE % | $T_m$ °C. | PCL diol wt. % |
|---|---|---|---|---|---|---|---|---|
| 1 | 35.00 | 1.690 | 7.800[1] | 620 | 35 | 270 | 172 | 16.7 |
| 2 | 30.40 | 1.105 | 9.000[2] | 490 | 36 | 270 | 173 | 22.2 |
| 3 | 32.00 | 2.325 | 10.50[1] | 470 | 26 | 220 | 167 | 23.0 |
| 4 | 30.00 | 1.317 | 11.30[2] | 420 | 33 | 450 | 173 | 26.5 |
| 5 | 28.00 | 1.476 | 13.00[2] | 390 | 40 | 540 | 172 | 28.2 |
| 6 | 26.30 | 1.461 | 12.35[2] | 340 | 31 | 430 | 170 | 30.8 |
| 7 | 27.49 | 1.696 | 14.74[2] | 300 | 30 | 450 | 168 | 33.3 |
| 8 | 24.00 | 1.996 | 17.50[2] | 270 | 38 | 600 | 169 | 38.5 |
| 9 | 25.30 | 2.993 | 18.25[2] | 250 | 29 | 500 | 164 | 42.0 |
| 10 | 20.94 | 2.725 | 21.00[2] | 210 | 26 | 540 | 162 | 47.5 |
| 11 | 18.42 | 1.630 | 20.25[2] | 250 | 28 | 630 | 165 | 50.0 |

[1] polycaprolactone diol with a mean molar mass of 1000 g/mol
[2] polycaprolactone diol with a mean molar mass of 2000 g/mol
[3] polycaprolactone diol with a mean molar mass of 3000 g/mol As the comparison of the moduli of the individual flexible polyamides from examples 1–12 and those of the block copolymers from comparative examples 1–11 show (see FIG. 1), the components used according to the invention to make them flexible are clearly more efficient than the aliphatic polyester segments in the comparative examples. Almost identically with the polycaprolactone blocks in their effect of making them flexible, are also the polyadipates of $C_2$–$C_6$ diols. That is to say, much lower concentrations of dimer diol components are needed to set a certain flexibility of a given polyamide compared with the longer-chain aliphatic polyester segments.

Figure 2:
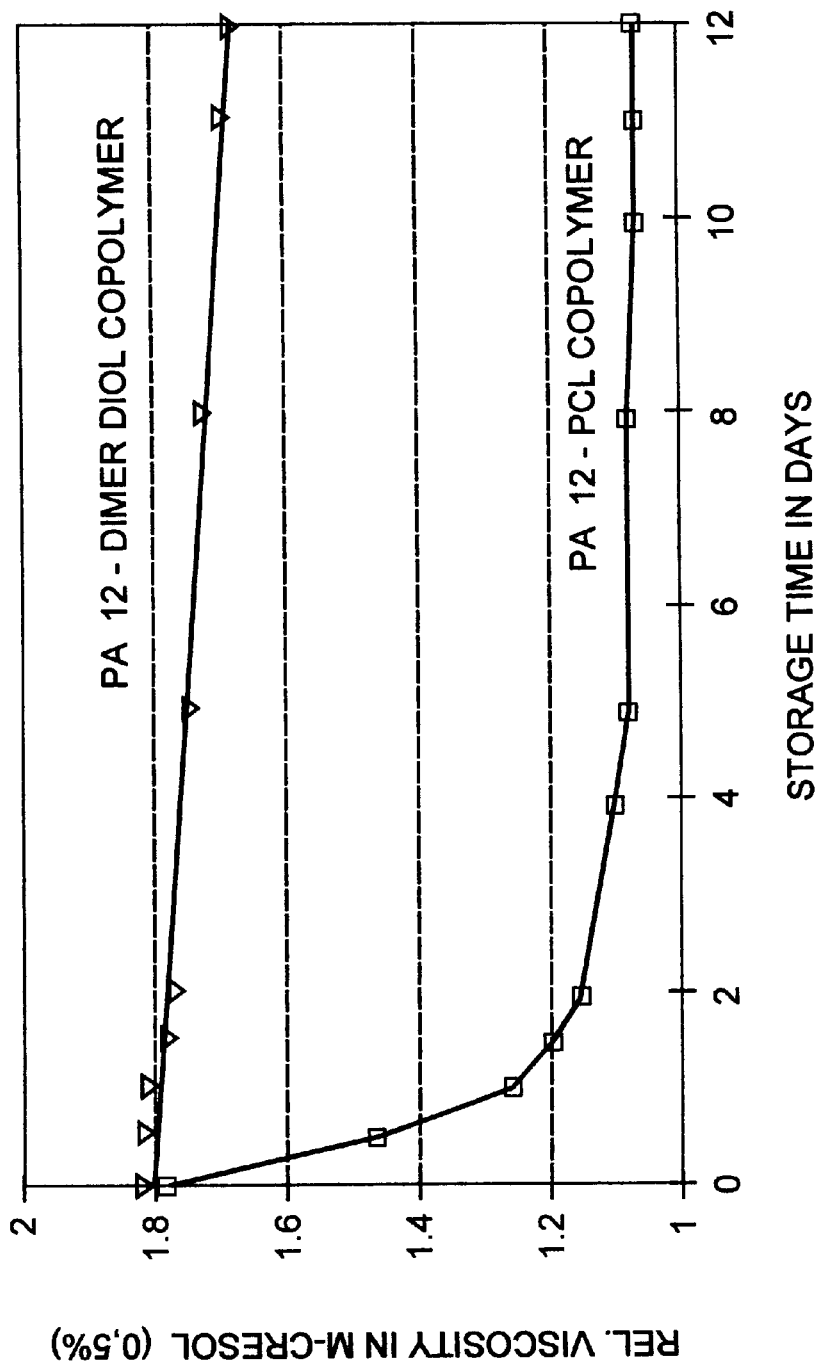
FIG. 2 is a graph showing copolymer hydrolysis comparisons.

Another advantage is the much better hydrolysis resistance in the case of the flexible polyamides according to the invention, as shown by FIG. 2. When the products from example 4 and comparative example 2, which have approximately the same concentration of soft segments, are stored in boiling water, the block copolymer of comparative example 2 is hydrolytically reduced within one day to such an extent that the mechanical properties are already inadequate and after five days it is already completely degraded, whereas the flexible polyamide according to the invention even after 12 days is only slightly hydrolytically attacked and still has very good mechanical properties.

Figure 3:
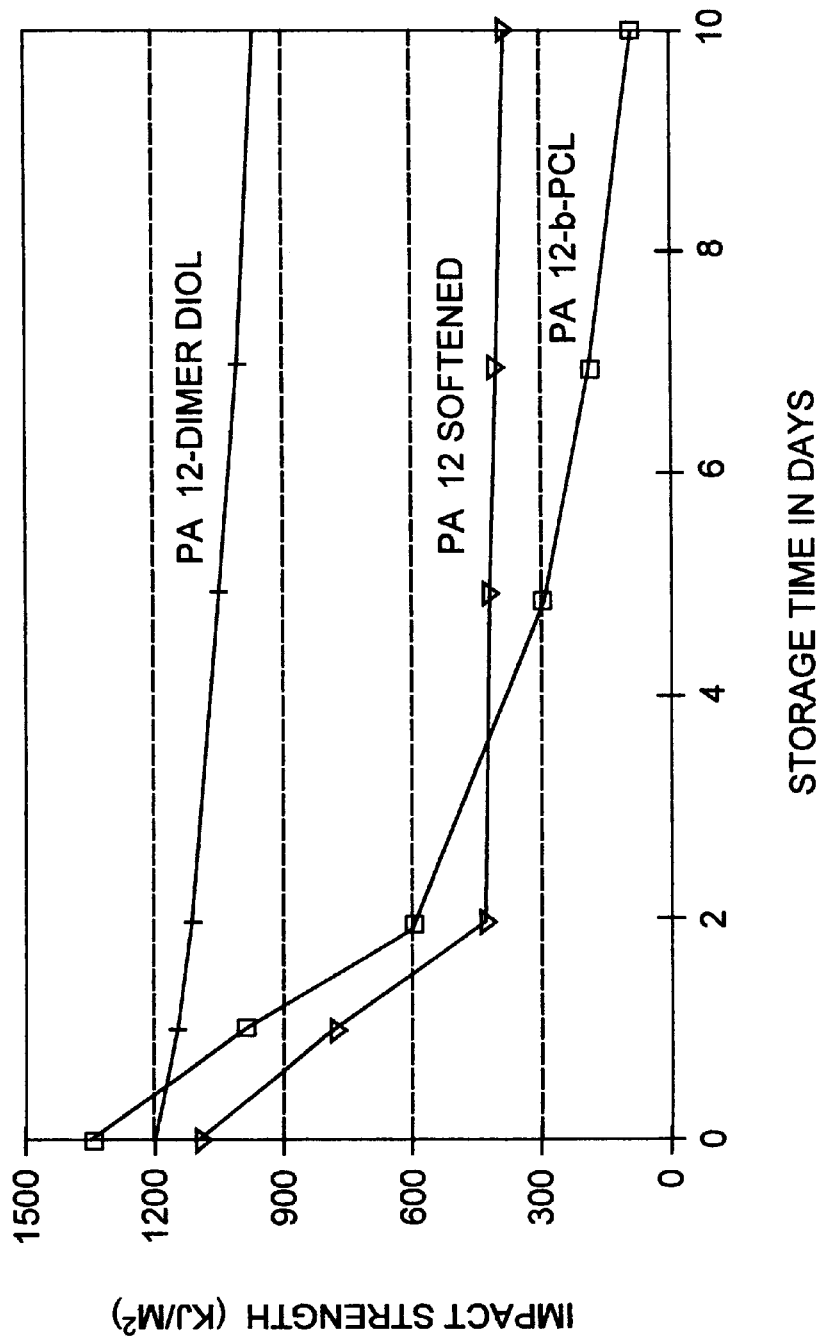
FIG. 3 is a graph of impact tensile strength as a function of storage time at 140° C.

Compared with softened polyamide the mechanical behavior of the flexible polyamides according to the invention does not change on contact with softener-eluting media or on storage at elevated temperatures. Thermal decomposition likewise does not arise as in the case of polycaprolactone copolymers. FIG. 3 shows the graph of impact tensile strength as a function of storage time at 140° C. As the softener BBSA which is used is exuded at this temperature within the first two days, the impact tensile strength drops to a much lower level. The polycaprolactone block polymer undergoes breaking of chains at this temperature and becomes brittle within the test period. The materials compared with each other in heat storage were stabilized with a combination of phosphite and sterically hindered phenol.

What is claimed is:

1. Polyamide containing substantially no softeners, prepared by polycondensation and/or polymerization of polyamide-forming monomers, wherein said polyamide was provided by adding 5–50 wt. % of a dimer diol with a molecular weight within the range of 400–1000 and/or corresponding OH-terminated polyesters.

2. Polyamide according to claim 1, wherein the dimer diol is a $C_{36}$ and/or $C_{44}$ dimer diol, the dimer diol content being at least 90%.

3. Polyamide according to claim 1, wherein the hydroxyl number of the dimer diol is within the range of 195–205 mg KOH/g.

4. Polyamide according to claim 1, wherein the OH-terminated polyester diol was prepared by condensation with aliphatic and/or aromatic dicarboxylic acids with 4–44 C atoms.

5. Polyamide according to claim 4, wherein the polyester diols have a hydroxyl number within the range of 28–90 mg KOH/g.

6. Polyamide according to claim 1, wherein the concentration of the diol component is within the range of 10–30 wt. % of the total formulation.

7. Polyamide according to claim 6, wherein the concentration of the diol component is within the range between 12–20 wt. % of the total formulation.

8. Polyamide according to claim 1, wherein $C_6$–$C_{12}$ lactams were used as the polyamide-forming monomers.

9. Polyamide according to claim 1, wherein $C_6$–$C_{12}$ aminocarboxylic acids were used as the polyamide-forming monomers.

10. Polyamide according to claim 1, wherein the polyamide-forming monomers were selected from the group consisting of linear and cyclic, aliphatic and aromatic dicarboxylic acids, linear and cyclic aliphatic and aromatic dicarboxylic acids, linear and cyclic aliphatic and aromatic diamines and corresponding salts of diamines and carboxylic acids.

11. Polyamide according to claim 1, wherein the polyamide-forming monomers were selected from the group consisting of $C_4$–$C_{44}$ dicarboxylic acids, TPA, IPA, naphthalene dicarboxylic acid and $C_2$–$C_{12}$ diamines.

12. Polyamide molding composition for the manufacture of fibers, sheets, moldings, or hot-melt adhesives, whereby said composition is formed by a polyamide according to claim 1.

* * * * *